US 8,181,089 B1

(12) United States Patent
Fernandes et al.

(10) Patent No.: US 8,181,089 B1
(45) Date of Patent: *May 15, 2012

(54) METHOD FOR AUTO-CORRECTION OF ERRORS IN A SOLID-STATE MEMORY SYSTEM

(75) Inventors: Cedric T. Fernandes, Columbia, MD (US); John Gordon Manning, Ellicott City, MD (US); Michael J. Piszczek, Laurel, MD (US); Lee Douglas McBryde, Mount Airy, MD (US); William Joseph Harker, Columbia, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/205,018

(22) Filed: Aug. 8, 2011

Related U.S. Application Data

(63) Continuation-in-part of application No. 11/844,664, filed on Aug. 24, 2007, now Pat. No. 8,020,074.

(51) Int. Cl.
*G11C 21/00* (2006.01)
(52) U.S. Cl. ............... 714/770; 714/801; 714/6; 714/25
(58) Field of Classification Search .................. 714/770, 714/801, 6, 25
See application file for complete search history.

(56) References Cited

U.S. PATENT DOCUMENTS

| 5,206,952 | A | * | 4/1993 | Sundet et al. | 710/241 |
|---|---|---|---|---|---|
| 5,343,426 | A | * | 8/1994 | Cassidy et al. | 365/189.02 |
| 5,406,529 | A | * | 4/1995 | Asano | 365/230.03 |
| 5,459,742 | A | * | 10/1995 | Cassidy et al. | 714/769 |
| 5,537,631 | A | * | 7/1996 | Wong et al. | 714/6.32 |
| 6,223,300 | B1 | | 4/2001 | Gotoh | |
| 6,453,345 | B2 | | 9/2002 | Trcka et al. | |
| 6,553,511 | B1 | | 4/2003 | DeKoning et al. | |
| 6,981,196 | B2 | * | 12/2005 | Davis et al. | 714/763 |
| 7,020,811 | B2 | * | 3/2006 | Byrd | 714/703 |
| 7,058,762 | B2 | | 6/2006 | Patterson et al. | |
| 7,073,024 | B1 | | 7/2006 | Chilton | |
| 7,107,507 | B2 | * | 9/2006 | Davis et al. | 714/763 |
| 7,127,668 | B2 | | 10/2006 | McBryde et al. | |
| 7,308,599 | B2 | | 12/2007 | Patterson | |
| 7,398,459 | B2 | | 7/2008 | Park et al. | |
| 7,640,484 | B2 | | 12/2009 | Corbet et al. | |

* cited by examiner

*Primary Examiner* — Esaw Abraham
(74) *Attorney, Agent, or Firm* — Rosenberg, Klein & Lee

(57) ABSTRACT

A method for auto-correction of errors in an array of solid-state storage devices having a plurality of storage channels dedicated to storing parity data to provide fault tolerance for a loss of at least two of the plurality of storage channels. A read operation from the storage channels transfers data to a plurality of channel memories. The data in the channel memories is checked to confirm the data is valid. Responsive to detection of invalid data, the data may be tested to identify the storage channel in error, including sequentially excluding data read form a different one of the plurality of channel memories from a parity check and determining the validity of data from remaining channel memories. If valid data is obtained, the storage channel from which the data was excluded is identified as the storage channel in error.

20 Claims, 4 Drawing Sheets

METHOD FOR AUTO-CORRECTION OF ERRORS IN A SOLID-STATE MEMORY SYSTEM

REFERENCE TO RELATED APPLICATIONS

The present Patent Application is a Continuation-In-Part of the patent application Ser. No. 11/844,664 filed on 24 Aug. 2007, now U.S. Pat. No. 8,020,074.

BACKGROUND OF THE INVENTION

1. Field of the Invention

The present invention is directed to a method for correcting errors in data read from an array of solid-state storage devices.

More particularly, the present invention is directed to an auto-correction method for detecting and repairing errors in stripes of data across the array of the sold-state storage devices.

Additionally, the present invention is directed to an auto-correction method utilizing a dual parity generation engine which may detect and correct errors in individual data words arranged in a block to prevent retirement of the entire block.

Still further, the present invention is directed to an error correcting technique for a memory system which takes advantage of the dual parity generation engine to transfer data from a cache memory to a stage buffer memory and to deliberately map out the data from each of the solid-state storage devices of an array thereof in a sequential manner as data is repetitively transferred between the cache memory and the stage buffer memory. Responsive to the Dual parity generation engine identifying valid data being obtained with the mapped-out solid-state storage device being a known single device fault, the mapped-out solid-state storage device is identified as the solid-state storage device in error. The valid data reconstructed by the dual parity generation engine and transferred to the stage buffer memory is subsequently transferred to a processor requesting the data to complete the read operation.

2. Background of the Invention

Computer systems often employ arrays of solid-state storage devices for storage and retrieval of large amounts of data.

Solid state memory devices use electrical charges to change the physical properties of a medium to store information in a non-volatile manner. One of the inherent advantages of the solid-state memory is fast data access time and low energy consumption.

Among the solid-state memory available, a flash memory is a memory which uses floating-gate transistors arranged in NOR or NAND gates to store data for electronic devices. Flash memory is one of the most widely used non-volatile memories. However it is prone to degradation which often shortens its lifespan considerably. Another type of solid-state storage is a phase-change memory which uses the difference in electrical resistivity between two states of a material to store data for electronic devices whereby the material changes states when heated and cooled.

Solid-state memory also includes memristor memory and carbon nanotubes. Memristor memory uses the change in resistivity of the media in relation to the direction of the current applied to it to store data. Electrical resistance increases if current is applied in one direction, and decreases as current is applied in a second direction. Carbon nanotube memory uses the position of carbon nanotubes between two substrates to store data. A properly applied charge changes the position of the carbon nanotubes which changes their electrical resistance.

In a flash memory, the data may quickly electrically erased and reprogrammed. Unlike traditional memories, such as DRAM or SRAM, the flash memory does not require power to retain the data. Unlike rotating media, there are no moving parts in flash memory. This allows flash memory to have higher bandwidth and lower latencies than traditional rotating media. Flash memory also consumes less power since no motors are required to spin or move any part of device. Flash memory is more expensive than rotating media but the advantages in speed, latency and power are making it increasingly attractive in mass storage systems.

There are two types of flash memory, i.e., NAND flash and NOR flash. Their names refer to the logic gates that are the fundamental building blocks of the memory. NOR flash is faster and more reliable than NAND flash but is more expensive. NAND flash has higher densities than NOR flash and is significantly cheaper but does not have an operational life as long as the NOR flash.

NAND flash may be implemented either as single-level cell (SLD) devices which store only one bit of information per cell, or as multi-level cell (MLC) devices which are able to store more than one bit per cell by choosing between multiple levels of electrical charge applied to the floating gates of the cells. This gives MLC devices a higher storage density than SLC devices but also may cause them to be more prone to errors and reduce the number of program/erase cycles before the cells wear out.

In memory systems, flash cells are grouped into pages. A page is the smallest "chunk" of data that may be read or programmed in one operation. Pages are typically formed with 2112 bytes of data for SLC devices, and 4314 bytes of data for MLC devices. The extra data bytes are used to store ECC (Error Correcting Code) bits and metadata information. The flash pages are then arranged into groups of 64 or 128 pages called blocks. The pages of a block may be read individually but the pages in the block must be programmed sequentially. All of the pages of a block are erased together. If a page can no longer be programmed correctly, or the block cannot be erased, then the entire block is retired.

Thousands of blocks are arranged together into a single die. A single die may only have one operation outstanding at a time, i.e., a "read", "program", or "erase". A flash part usually has 2 die per part. Flash storage devices typically have a number of parts to allow for multiple concurrent access.

Flash devices are not 100% reliable and often ship with 1-2% of the cells being defective. Data in flash cells also degrades over time and is subject to disturbances from external influences such as, for example, temperature. Extra bits for ECC are required to detect and correct the errors in the data. To prevent loss of the data, the flash storage device must monitor IO access to the device and the ECC bits, and additionally use wear leveling to correct problems.

Wear leveling is a method of moving data between flash cells to prolong the life of the flash cells. Typically SLC devices will wear out after 100K program/erase cycles and MLC device wear out after 5K to 7K program/erase cycles.

The most prevalent source of corruption of cell data is "Program disturb", which may occur when cells not being programmed are disturbed by nearby program operations. This does not damage the cells but may corrupt the data contained therein.

"Read disturb" is also an issue with flash devices. Although being minor per each operation, this problem may accumulate over time. Traditionally the cell data will need to be refreshed after approximately one million "read" cycles for SLC and 100K "read" cycles for MLC.

Flash cells also may wear out over time since the gate levels trends towards a quiescent level. The cells also wear out with each "program"/"erase" cycle as excess charge accumulates in the dielectric. This puts a limit on the lifespan of the flash parts since the cells can no longer be used when either the "program" or "erase" operation fails. Wear leveling is used to limit number of "program"/"erase" cycles to individual cells by spreading the "program"/"erase" cycles across all of the flash cells.

The current state of flash technology may suffer from the following drawbacks:

(a) latency increases as cells wear out since more time is needed to erase cells, program the cells, and accurately read the data in the cells;

(b) "writes" typically take an order of magnitude longer than "reads";

(c) "erase" operations may take significantly longer than "writes" but are performed on an entire block;

(d) wear leveling may introduce large delays due to reading the entire block, programming to new block, and erasing the old block;

(e) wear out of cells in pages may cause delays when the pages need to be re-mapped. Pages are arranged in groups called blocks. If a single page fails then the data in the entire block of pages must be moved so the block can be retired. Controllers must check the status of "program" and "erase" operations. Blocks are marked as "bad" and can no longer be used when these operations fail;

(f) flash parts rely on ECC to protect data. Flash controllers detect and correct many errors but error correction may not always be possible. "Read" operations only return "good", "marginal" and "bad" status, where "good" indicates the data is healthy or minimal EEC correction is needed to recover the data, "marginal" indicates that the data was read but many errors were recovered or little ECC protection remains, and "failed" indicates that the data had too many errors and could not be read correctly.

Examples of Typical MLSL and SLC Parts:

| Typical part size | (MLC) | (SLC) |
|---|---|---|
| bytes per page | 4314 | 2112 |
| pages per block | 128 | 64 |
| ECC (per 512 bytes) | 4+ | 1 |
| Endurance | ~5K | ~100K |
| Read (max) | 50 us | 25 us |
| Program | 600-900 us | 200-300 us |
| Erase | 3000 us | 2000 us |

Latency Examples of MLC Parts:

Total time to read entire block=50 us/page*128 pages/blocks=6400 us (6.4 msec).

Total Min time to program entire block=600 us/page*128 pages/blocks=76800 us (76.8 msec).

Total Max time to program entire block=900 us/page*128 pages/blocks=115200 us (115.2 msec).

Total time to erase entire block—3000 us (3.0 msec).

Total time to wear level one block=(50 us/page+600 us/page)*128 pages/blocks+3000 us/block=79850 us (79.85 msec).

It is clear that the recovery operation due to a single failed page may cause significant IO delays.

Phase-change memory (also known as PCME, PRAM, PCRAM or C-RAM) uses the unique properties of amorphous and crystalline chalcogenide glass to store data. By carefully heating chalcogenide glass, it may be switched between the amorphous state which has high electrical resistance and the crystalline state which has a lower electrical resistance.

Phase-change memory has the potential to scale beyond the capacity of flash devices with faster access times. It also may endure millions of "program"/"erase" cycles before the part degrades. Unlike flash, the data stored in PRAM devices are not subject to disturbance from "reads" and nearby "writes".

However, as a disadvantage, PRAM is more susceptible to temperature changes. A device may be erased simply by heating it to a sufficient temperature.

PRAM devices are also susceptible to data deterioration due to mechanical stress on the cells since the data is in a PRAM device is stored due to a physical change in the properties of the media. The chalcogenide glass expands and contracts slightly with every "program" operation and this may cause an undesirable contact between the glass and the adjacent dielectric.

In view of the drawbacks of the current state of solid-state storage systems, a reliable prevention of the data corruption and errors detection/correction constitutes an important issue.

To improve the reliability of data storage systems, redundant arrays of disk drives have been utilized. Redundant Arrays of Independent Disks (RAID) have recently grown in usage. In the originally proposed five levels of RAID systems, RAID-5 systems has gained great popularity for use in local area networks and independent personal computer systems, such as media database systems. In RAID-5 systems, data is interleaved by stripe units across the various disk drives of the array along with error correcting parity information. However, unlike RAID-3 systems wherein there is a dedicated parity disk, RAID-5 systems distribute parity across all of the disk drives in an interleaved fashion.

The parity data in a RAID-5 system provides the ability to correct data only for a failure of a single disk drive of the array. Data storage systems requiring a greater fault tolerance, utilize a later proposed RAID-6 system. In RAID-6 systems, data is interleaved in stripe units distributed with parity information across all of the disk drives. To overcome the disadvantage of the RAID-5 system inability to correct for a failure of more than one disk drive, the RAID-6 system utilizes a redundancy scheme that can recover from a failure of any two disk drives. The RAID-6 parity scheme typically utilize either a two-dimensional XOR algorithm or a Reed-Solomon Code in a P+Q redundancy scheme.

Even utilizing the RAID-6 architecture, such systems while having the ability to detect failures in up to two disk drives, cannot correct the data unless each disk drive in error is identified. Such is the case in the storage system architecture disclosed in U.S. Pat. No. 7,127,668, but modified with an additional parity drive for use with a dual parity engine. Without the ability to identify the disk storage channel in error, the more fault tolerant parity algorithm of the RAID-6 system is unable to provide corrected data to the requesting processor, and must therefore report a "read error" to the processor requesting the data. Thus, there is a need to provide a means for identifying the disk drive in error in such instances.

In comparison with disk drives, solid-state memory storage devices provide a faster access time than rotating media due to the absence of moving parts, and require less energy for operation due to the absence of motors to move the media. It therefore would be advantageous to apply the principals of the reliability used in RAID systems to the inherent advantages provided by the solid-state storage devices, and to further advance such a "hybrid" memory storage system towards substantially error-free data "read" operation through identification and auto-correction of detected errors.

SUMMARY OF THE INVENTION

It is an object of the present invention to provide a fast access and low energy consuming memory system with a high level of fault tolerance.

It is another object of the present invention to provide a method for auto-correction of errors in an array of a plurality of solid-state storage devices having at least a pair of the solid-state storage devices dedicated to storing parity data to provide a fault tolerance for a loss of at least two of the solid-state storage devices.

In order to accomplish this goal, the array of the solid-state storage devices is arranged with a plurality of storage channels, and during performing of a "read" operation from the array, the data read from each of the plurality of storage channels are transferred to a corresponding channel memory. The data from the channel memories are read, and a parity check of the data read from the channel memories is performed.

Further, the data is tested to identify one of the plurality of storage channels as being in error responsive to a failure of the parity check. Following the identification of one of the storage channels as being in error, the subject method uses remaining others of the plurality of storage channels to provide valid data to a processor requesting that data, thereby auto-correcting the errors in real time in a process that is transparent to the requesting processor.

In an alternative embodiment, after transferring data read from each of the plurality of storage channels to a corresponding channel memory, the subject system reads the data in the channel memories and determines whether the data is valid. If the data is valid, then the data is transferred to a processor requesting the data. If however, the data is invalid, the system determines which of the storage channels is in error.

The determination of the fault storage channel is carried out through the step of sequentially excluding data from a different one of the plurality of channel memories and determining if data from remaining channel memories provide valid data. If valid data is obtained, then the storage channel corresponding to the channel memory from which the data was excluded is designated as the storage channel in error. Having identified the storage channel in error, then the valid data is obtained from the parity algorithm, utilizing the remaining channel memories. The valid data then is transferred to the processor requesting the data.

From yet another aspect, the subject method for auto-correction of errors in a solid-state storage array arranged with a plurality of storage channels which are formed with at least two parity storage solid-state storage devices and a multiplicity of data solid-state storage devices, includes the step of providing a channel memory corresponding to each of the plurality of storage channels for temporary storage of data to be written thereto and data read therefrom.

Further, the system performs a "read" operation from the solid-state storage devices array. During the "read" operation, the system transfers data read from each of the storage channels to a corresponding channel memory.

Further, the method includes the step of transferring the data from the plurality of channel memories to a buffer memory and determining if the data is valid, and if valid, then transferring the data from the buffer memory to a processor requesting the data.

If, however, the data is invalid, then the data transfer from the plurality of channel memories to the buffer memory is repeated, and a determination is made as to whether the data is valid. If the data is still invalid, and the storage channel in error is unidentified, then the system determines which of the storage channels is in error by repeatedly transferring the data from the channel memories while sequentially excluding data from a different one of the plurality of channel memories and determining if data from remaining channel memories provide valid data. In that arrangement, a particular storage channel in error may thereby be identified so that the data from the excluded storage channel may be reconstructed, and valid data then may be provided to the requesting processor in real time.

DESCRIPTION OF THE PREFERRED EMBODIMENT

Figure 1:
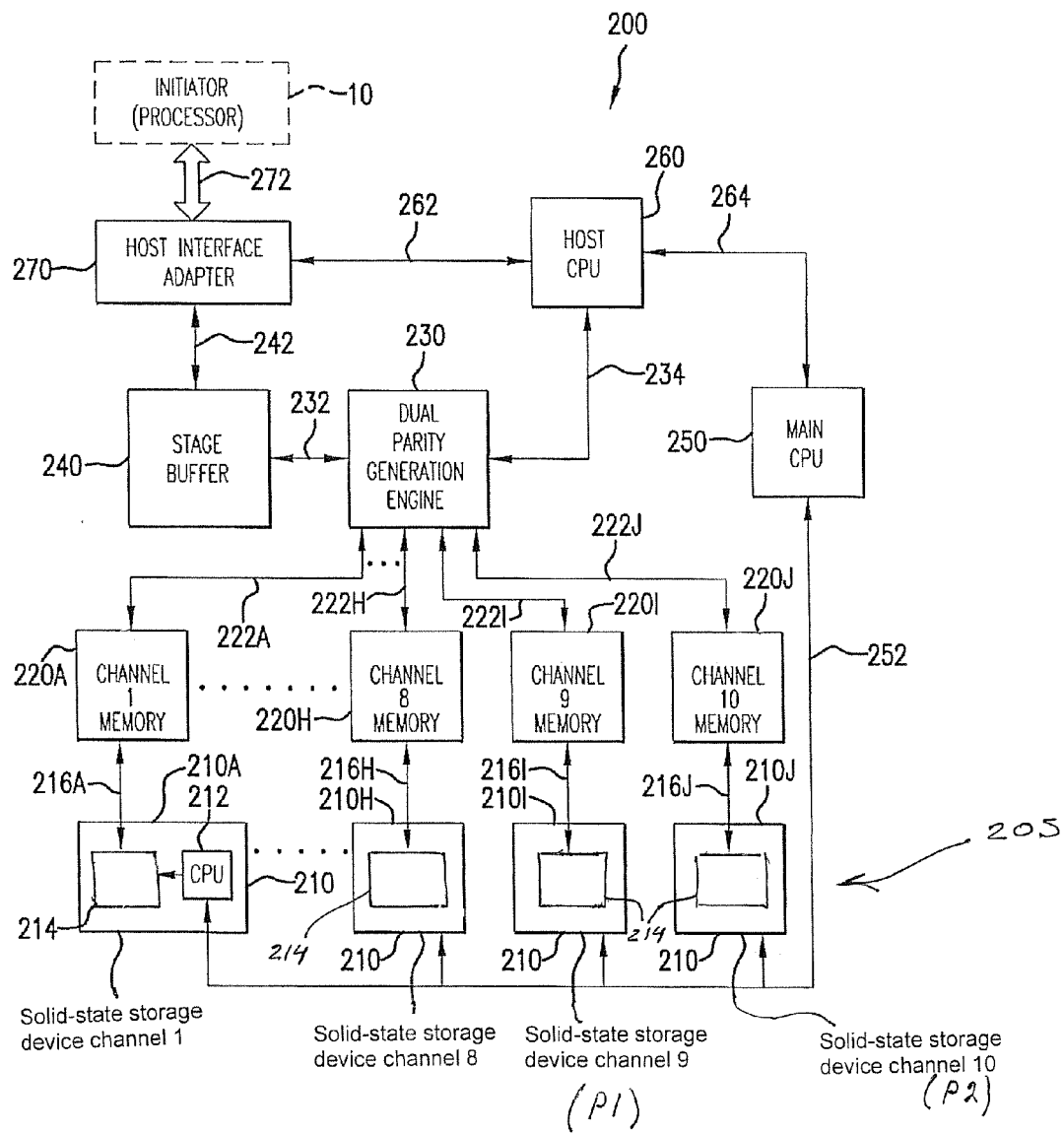
FIG. 1 is a simplified block diagram illustrating the architecture of the memory system of the present invention.

Referring now to FIG. 1, there is shown a memory system 200 for storing and retrieving data for use by one or more processors 10, hereinafter referred to also as an initiator. As will be presented in following paragraphs, the memory system 200 includes a mechanism for auto-correction of errors to provide valid data to a requesting initiator 10.

Although not restricted to any particular array of storage devices, the auto-correction capability of the memory system 200 is illustrated herein in conjunction with a memory system utilizing a storage array 205 which is based on a plurality of solid-state storage devices, such as, for example, flash memory, phase-charge memory, as well as memristor memory, and carbon nanotubes memory. The memory system also is contemplated, as an example, as a system having at least two storage device fault tolerance.

To be functional, the auto-correction of errors which is transparent to the initiator 10, requires memory architecture which is able to tolerate the failure of at least two solid-state storage devices 210 of the memory system 200. The subject memory system 200 is able to provide corrected data efficiently, often without the need to re-read data from the solid-state storage devices and without the need for the initiator to request a subsequent attempt to re-read the data from the solid-state storage devices, and thereby provide high performance data transfer.

The array 205 includes solid-state storage devices 210 for storing data and parity values corresponding to the data stored in the array. Extra ECC bits are added to the data stored in solid state storage devices to help protect the data from corruption. During a "read" operation, the ECC bits are used to determine if an error was detected in the data and if the error was corrected. However, the ECC bits may not be sufficient to correct every error. The flash parts can only report that the data was "good" (or recovered with ECC), "marginal" (refresh is recommended), or "bad" (data is unreliable). However, they are not capable of reporting which portions of the data are "bad" when read. This is especially important as the size of the data in the flash blocks is larger than with MLC. Flash block sizes of 4K, 8K, 16K and larger may be used. As a result it is possible to lose the contents of the entire page because of errors in a single word of data.

As will be presented in following paragraphs, the subject auto correction mechanism can remedy the insufficiency of ECC technique. In the present memory system 200 the subject error auto correction is used to detect and repair errors in the stripe of data across all of the solid-state storage devices 210. The reliability principles of RAID (Redundant Array of Independent Disks) systems are applied to the solid-state memory system 200. The dual parity RAID engine may narrow down and correct errors on an individual page of the solid-state storage devices instead of retiring the entire block. The additional level of data integrity checking in the present invention may detect and auto correct these errors in real time.

The array 205 includes a multiplicity of data storage channels which in the example illustrated herein, is formed by eight data storage channels 210A-210H. Data storage channels may be formed by a larger or smaller number of solid-state storage devices, the number being chosen based on such factors as the data capacity for memory system 200, cost, and reliability requirements. The array 205 of the solid-state storage devices 210 includes at least two parity storage channels 210I and 210J for storing check data corresponding to the data stripes stored in the plurality of storage channels 210A-210H.

Memory system 200 provides increased storage functions and reliability through redundancy, and storage virtualization similar to RAID systems in which data storage devices are implemented as solid-state storage devices. For example, if flash memory is used, individual flash pages may be correlated to individual disk blocks of RAID systems. Additionally, the solid-state die (or chip) may be correlated with a single disk of a RAID system.

Similar to RAID systems, in the subject memory system 200, the computer data storage scheme can divide and replicate data among multiple solid-state storage devices 210. The array 205 is accessed by the operating system as one single solid-state storage. Different data storage schemes or architectures may be used in the memory system 200, depending on the desired balance between data reliability and input/output performance.

For example, data may be written identically to multiple solid-state storage devices. The array 205 then continues to operate as long as at least one drive is functioning.

Alternatively, the bit-level striping with dedicated Hamming-code parity may be used, when data is striped such that each sequential bit is on a different solid-state storage device. Hamming-code parity is calculated across corresponding bits on solid-sate storage device and stored on at least one parity solid-state storage device.

The memory system 200 may use byte-level striping with dedicated parity where data is striped so each sequential byte is on a different solid-state storage device. Parity is calculated across corresponding bytes on data solid-state storage device and stored on a dedicated parity solid-state storage device.

Further, the memory system 200 may use block-level striping with dedicated parity scheme. With this scheme, all parity data is confined to a single solid-state storage device. This however may create a performance bottleneck.

The memory system 200 also may be based on block-level striping with distributed parity architecture, which distributes parity along with the data and requires all solid-state storage devices but one to be present to operate. The array 205 is not destroyed by a single solid-state storage device failure. Upon drive failure, any subsequent reads may be calculated from the distributed parity such that the drive failure is masked from the end user.

In another alternative implementation, the memory system 200 may use block-level striping with double distributed parity which provides fault tolerance of two solid-state storage devices failures. The array 205 may continue to operate with up to two failed storage channels.

In an exemplary implementation, the subject memory system 200 stripes the data across the plurality of data solid-state storage channels 1-8, and reserves dedicated parity drives for storing the parity information. Utilizing the dual parity generation engine 230, the memory system 200 provides two parity storage channels, e.g., channels 9 and 10, to provide two physical parity storage channels dedicated to parity data storage. Each of the solid-state storage devices 210 includes a control central processing unit (CPU) 212 for controlling the operation of the storage media 214, which for clarity are representatively shown for only the storage channel 210A.

Each of the storage channels 210A-210J is respectively coupled to a channel memory 220A-220J through a corresponding data bus 216A-216J. Each of the channel memories 220A-220J acts as a data cache for data being read from the written to the corresponding solid-state storage devices 210. The channel memories 220A-220J may be separate and distinct dual port memories, or a single dual port memory which is divided into a plurality of subunits corresponding to the data stripes for each of the storage channels.

The data read into the plurality of channel memories 220A-220J is read by a dual parity generation engine 230, processed to determine the validity of the data, and the data transferred to a stage buffer 240. The data read from the plurality of channel memories 220A-220J is transferred to the dual parity generation engine 230 by means of a corresponding data bus 222A-222J. The data transferred on each data bus 222A-222J includes the corresponding data read from the storage channels 210A-210J, plus additional parity bits added to enable detection of transmission errors between the channel memories 220A-220J and the dual parity generation engine 230.

The dual parity generation engine 230 may be a processor which implements a dual parity two-dimensional XOR algorithm or a Reed-Solomon P+Q algorithm having the ability to detect a failure of two of the plurality of storage channels 210A-210J. The dual parity generation engine can also be provided as hardware implementation of the particular dual parity algorithm being utilized. Although the particular implementation of the dual parity generation engine and the dual parity algorithm are not important to the inventive concepts, as described herein, a field programmable gate array implementing a two-dimensional XOR algorithm has been successfully utilized to implement the dual parity generation engine in one working embodiment of the present invention.

The dual parity generation engine 230 transfers the data to the stage buffer through a data bus 232 controlled and monitored by a host CPU 260 through a bus 234. Stage buffer 240 is a dual port memory which provides validated data to a host interface adaptor 270 through a direct memory access (DMA) bus 242.

The host interface adaptor 270, under control of the host CPU 260, through the host interface control bus 262, provides the data read from the stage buffer 240 to an initiator 210 through an interface bus 272. The host interface adaptor 270 provides the bus conversion between the DMA bus 242 and the interface bus 272.

The interface bus 272 may be a peripheral component interconnect (PCI) bus, a peripheral component interconnect extended (PCI-X) bus, a peripheral component interconnect express (PCX) bus, hyper transport (HTX) bus, or any other internal high speed communication bus appropriate for interfacing the memory system 200 with one or more initiators 10.

Where the memory system 200 is an external peripheral to a computer system or network, the interface bus 272 may be a distributed bus such as Ethernet or fiber channel, or other high speed distributed bus architecture.

Main CPU 250 monitors and controls the operation of the plurality of storage channels 210A-210J through a control bus 252. As representatively shown with respect to the storage channel 210A, the main CPU 250 communicates with a CPU 212 of each respective solid-state storage device 210, in order to control the "read" and "write" operations of the respective solid-state storage device and monitor the status thereof.

The main CPU 250 communicates with the host CPU 260 through the CPU control and communications bus 264, signaling the host CPU when the read or write operations of the storage channels has been completed. Host CPU 260 controls the dual parity generation engine 230 through the bus 234 to test and transfer data from the plurality of channel memories 220A-220J to the stage buffer 240. After a transfer of valid data has been completed, the CPU 260 will instruct the host interface adaptor 270 to transfer the data from the stage buffer 240 to the initiator 10.

If the transfer status returned by the dual parity generation engine 230 to the host CPU 260 indicates the data is invalid, the host CPU 260 begins the "error recovery" procedure. As will be discussed in following paragraphs, the first step in the error recovery is to retry the original transfer from the plurality of channel memories 220A-220J through the dual parity generation engine 230 to the stage buffer 240. This retry of the transfer repairs most soft data errors and soft bus parity errors.

If the "retry" does not produce valid data, the processor will determine whether the storage channel in error is known, as when there is a bus parity error, an identified defective solid-state storage device 210, or a solid-state storage device having known "bad" data, as when a new solid-state storage device has been placed on-line which has not yet had its data rebuilt. Under these circumstances, the host processor 260 recovers the "bad" (or missing) data utilizing the parity algorithm.

Absent the identification of the storage channel in error, conventional systems, while identifying that the data is invalid, are unable to reconstruct the missing or invalid data. When the storage channel in error is unknown, conventional systems are only able to confirm that the data is not valid. In order to overcome that deficiency, in the present memory system 200, the host CPU 260 includes an auto-correction algorithm designed for instructing the dual parity generation engine to perform further tests on the data to try to identify the storage channel in error.

Figure 2:
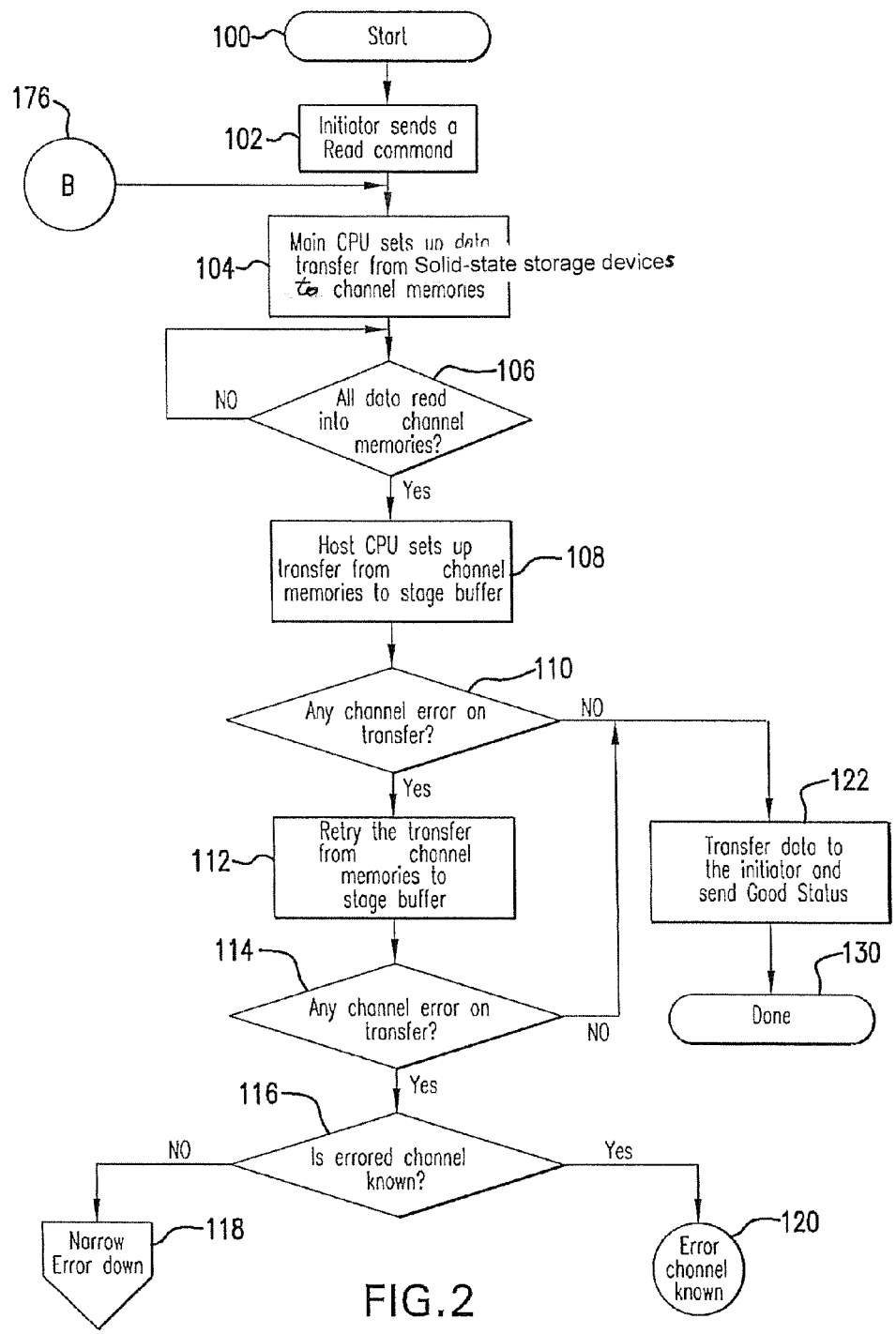
FIGS. 2, 3A and 3B cumulatively represent a flow-chart of the process for reading, parity checking, determining a storage channel in error, and correcting data, or indicating an error status, in accordance with the present invention.
Figure 3A:
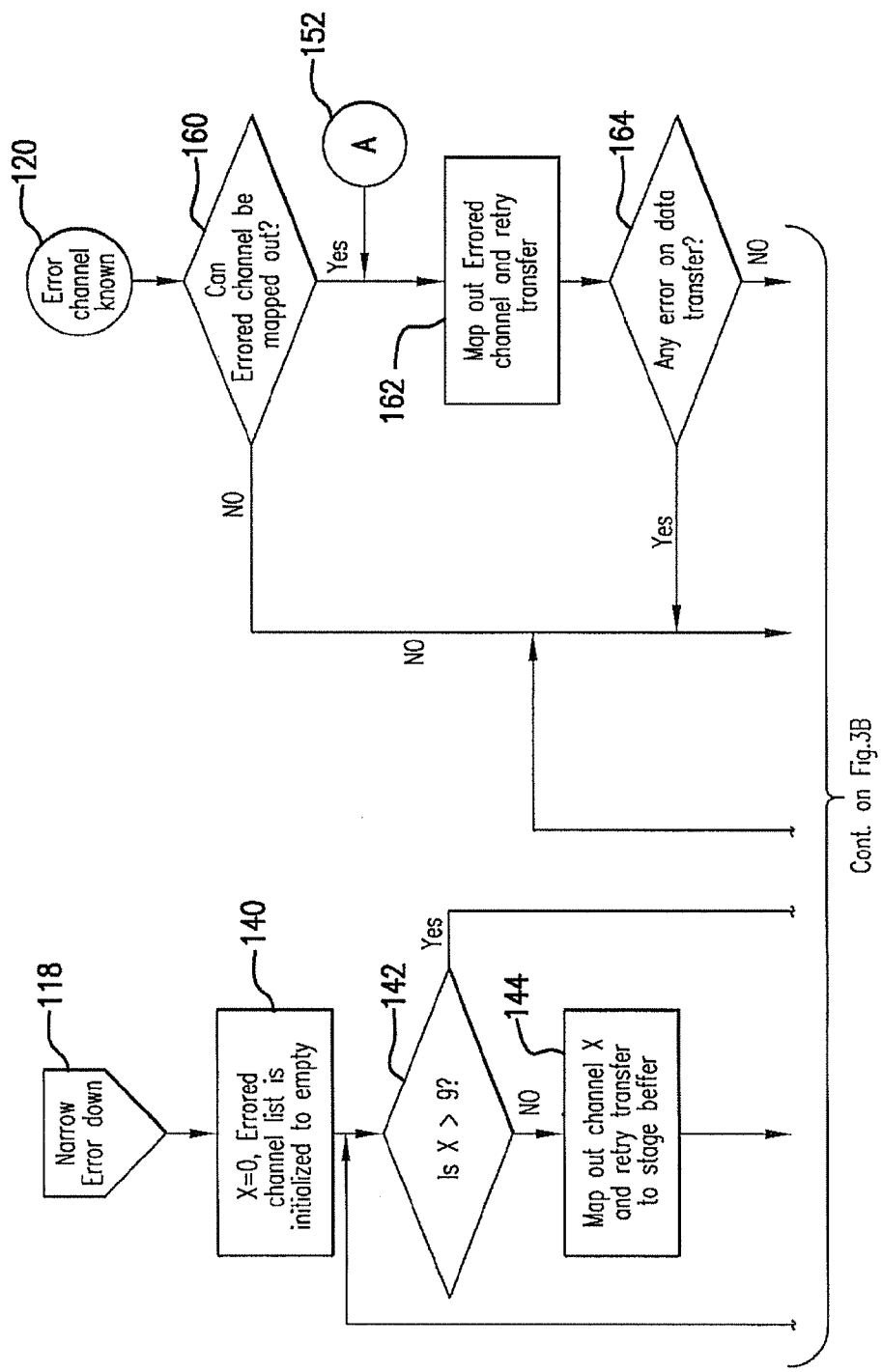
Figure 3B:
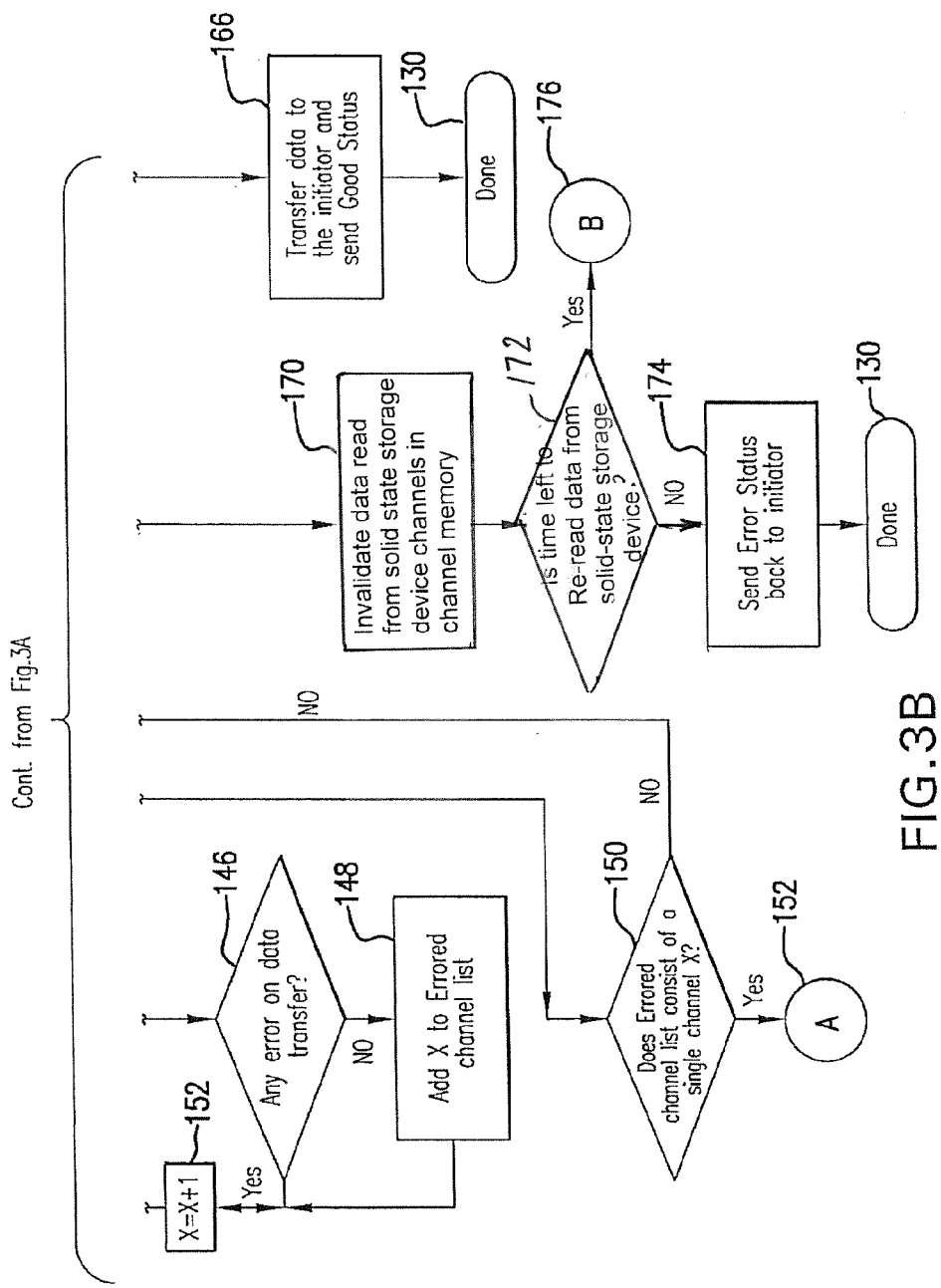

Referring now to FIGS. 2, 3A and 3B cumulatively, there is shown a flow chart illustrating a "read" operation of the memory system 200 incorporating the auto-correction algorithm provided by the host CPU 260 of the subject memory system 200. The process starts from block 100 and flows to block 102 where the initiator 10 sends a "read" command through the host interface adaptor 270 to the host CPU 260. The host CPU 260 communicates the "read" command to the main CPU 250 and the flow then moves to block 104, where the main CPU 250 sets up data transfers from the plurality of solid-state storage devices 210 to the corresponding channel memories 220A-220J.

The flow then passes to the decision block 106, wherein it is determined whether all of the data has been read into the channel memories 220A-220J. If all of the data has not been read into the channel memories, the logic remains at decision block 106 until the data transfer has been completed for all of the storage channels.

Once all of the data has been read into the channel memories, the flow then passes to block 108 wherein the host CPU 260 sets up the transfer from the channel memories 220A-220J to the stage buffer 240.

The logic then passes to decision block 110 wherein it is determined whether any channel error has occurred on the transfer to the stage buffer. If no error has been detected, the flow then passes to block 122, wherein the data is transferred from the stage buffer to the initiator and a "good" status is also issued and sent to the initiator. From there, the routine terminates with block 130.

If however, an error on transfer has been detected, the flow passes to block 112 wherein the transfer from the channel memories to the stage buffer is retried.

From the block 112, the logic then passes to decision block 114, where it is determined whether a channel error has been detected. If no channel error has been detected, then the flow will pass to block 122, as previously discussed.

If however, an error is detected, the flow then passes to decision block 114, where it is determined whether the error channel is known.

As previously discussed, the error channel may be known due to a bus parity error, known "bad" solid-state storage device identified by the main CPU 250, or a solid-state storage device with "bad" data, as when a new solid-state storage device has been brought on-line, but has not yet had its data rebuilt, which status is also maintained by the main CPU 250. Thus, if the error channel is known, the flow from decision block 116 passes to the connector 120, and if it is unknown which channel is in error, the flow passes to connector 118 for processing to determine the channel which is in error.

From connector 120, the flow passes to decision block 160 where it is determined whether the error channel can be mapped out. The storage channel can be "mapped out" by excluding the data from the storage channel and utilizing the parity algorithm to recover the data. As the dual parity algorithm (as described in previous paragraphs) may tolerate loss of two storage channels and still recover valid data, the decision block will be answered in the affirmative as long as no more than two storage channels are in error, as for the conventional block-level striping with double distributed parity algorithm. Obviously, where a greater fault tolerance is required, the further parity storage channels are added, and other algorithms may be utilized to recover more than a loss of two storage channels.

If decision block 160 is answered in the affirmative manner, the flow passes to block 162, where the error channel is mapped out and the transfer from the remaining storage channels is transferred through the dual parity generation engine 230 to the stage buffer 240, with the missing data recovered utilizing the dual parity algorithm. Flow then passes to decision block 164, where it is determined whether the data transfer has successfully transferred valid data, to the stage buffer 240. If no data transfer errors have been detected, then flow passes to block 166. In block 166 the data is transferred from the stage buffer 240 to the initiator 10 through the host interface adapter 270. From block 166, the logic flow then exits the routine at block 130.

If at decision block 160, the known error channel cannot be mapped out, as when there are already two identified channels in error, the logic flows to block 170 where data read from the storage channels 210A-210J to the corresponding channel memory 220A-220J is invalidated. The consequences of the data being invalidated will be described in following paragraphs.

Next, the flow passes to decision block 172 where it is determined if there is sufficient time to re-read the data from the solid-state storage devices 210. The initiator 10 expects to receive a response to a "read" request within a certain time period (timeout period) so that it does not waste resources waiting for a response from system 200.

The memory system 200 likewise has a timeout period established in which to transfer data to the initiator 10. The timeout period of system 200 is typically established to be slightly less than that of the initiator 10, and if valid data is not transferred to the initiator 10 by the expiration of the system 200 timeout period, an error message is sent to initiator 10 before it has "timed out". Thus, at this point in the logic, if there is sufficient time left in the timeout period of the system 200 to re-read the data from the solid-state storage devices, then the flow passes to the connector 176 to bring the flow back to block 104 to repeat the process as described in the preceding paragraphs. By this arrangement, even a re-reading of data from the storage devices is accomplished in a manner that is transparent to the initiator in real time. If in decision block 172 it is determined that insufficient time remains in the timeout period to re-read the data, the flow passes to block 174. In block 174, an error status is sent to the initiator 10 by the host CPU 260. From block 174, the flow then exits the routine at block 130.

In order to provide high performance, the memory system 200 provides a sufficiently large channel memory 220A-220J to store data from multiple "read" operations. Therefore, the data from one "read" operation which is stored in the channel memories 220A-220J is available for transfer to the initiator 10 on a subsequent request, or transfer to a different initiator requesting the same data. Transferring the data from a cache storage provides for a far greater access speed for the memory system 200. Where data has been invalidated in block 170, that data is not maintained in the channel memories, and in fact is not mapped to storage locations of channel memories. Therefore, a subsequent read request for that same block of data will not be provided from the channel memories, but instead re-read from the storage channels 210A-210J so that the processing in the dual parity generation engine 230 can take place with fresh data.

The ability to utilize the data stored in the channel memories 220A-220J permits the error channel processing, as now will be described, to be accomplished in real time without significantly degrading the performance of the memory system 200, to provide error processing that is transparent to the initiator 10.

When the error channel is not known, the logic passes from decision block 116, through the connector 118, to block 140, where the routine is initialized and a starting channel is reset to zero. From block 140, the flow passes to decision block 142, where it is determined whether the variable X has been incremented to a value which is greater than the total number of storage channels in the memory system 200. In the example described herein, a value X greater than a value of 9 represents a storage channel greater than 10.

If the value of the variable X has not exceeded the total number of storage channels, then the flow passes to block 144. In block 144, the storage channel identified by the variable X (X=0 identifies storage channel 1 (210A)) is mapped out and the transfer from the channel memories corresponding to the other (non-mapped out) storage memories is processed by the Dual parity generation engine while being transferred to the stage buffer.

From block 144, the flow passes to decision block 146, where it is determined whether an error is detected on the data transfer, exclusive of the mapped-out storage channel. If no error is detected, then the mapped-out channel is responsible for the original error, which could not previously be identified, and thus, the flow passes to block 148.

In block 148, the mapped-out storage channel number is stored in an error channel list. From block 148, and from decision block 146 where an error on data transfer is detected, flow passes to block 152, where the channel number is incremented and then the flow passes back to decision block 142 to repeat the sequence of steps just described.

By this arrangement, each of the plurality of storage channels is successively mapped out and the data transfer repeated so as to try to determine the identification of a storage channel from which invalid data was obtained with respect to the read operation requested by the initiator. Once all of the storage channels have been sequentially mapped out, the flow passes from decision block 142 to decision block 150.

In decision block 150, it is determined whether the errored channel list consists of a single identified channel. If the channel list consists of more than one channel, then the flow passes to block 168, to send an error status back to the initiator, since without the error channel being confined to a single channel, the certainty of the identification of the storage channels in error cannot be assured.

If however, the channel list identifies a single channel, then the flow passes from block 150 to block 162 through the connector 152. As previously described, the identified channel is mapped out, the transfer repeated, and the data recovered for the mapped out drive utilizing the algorithm, similar to that of block-level striping with double distributed parity. Since the transfers through the dual parity generation engine to the stage memory are provided by the channel memories, those transfers are performed at a high data rate, and thus the performance of the memory system 200 is considerably greater than if the data had to be re-read from the solid-state storage devices 210 each time the validity of the data had to be tested when a storage channel was mapped out.

In fact, due to the probability for read errors from solid-state storage devices, there would be some measure of uncertainty as to the repeatability of storage channel error on any particular storage channel and an uncertainty as to developing an error in a different storage channel, if such testing had to be carried out by accessing the solid-state storage devices each time a different storage channel was to be mapped-out. Thus, based on current solid-state storage device 210 performance, both performance and reliability would suffer if the method of the instant invention were implemented using consecutive accesses of the solid-state storage devices.

Therefore, it may be seen that the memory system 200 utilizes a method for auto-correction of errors in the array 205 of a plurality of solid-state storage devices 210 wherein at least a pair 210I and 210J of the plurality of solid-state storage devices 210 are dedicated to storing parity data to provide a fault tolerance for a loss of at least two of the plurality of solid-state storage devices 210. The array 205 of solid-state storage devices 210 is arranged with a plurality of storage channels 210A-210J, which in response to a "read" operation results in the transfer of data read from each of the storage channels 210A-210J to a corresponding channel memory 220A-220J. Subsequently, the data stored in the plurality of channel memories 220A-220J is parity checked to determine if the data is valid. Responsive to a failure of the parity check, the data is tested to identify the storage channel which is in error. Once the storage channel in error is identified, the remaining other of the plurality of storage channels are utilized to reconstruct valid data.

In order to identify the storage channel which is in error, a process of sequentially excluding data from a different one of the plurality of channel memories 220A-220J is carried out, each time determining if data from the remaining channel memories provide valid data. If valid data is produced, then the storage channel which has been "mapped out" (data excluded from the parity check and transfer to the stage buffer) is designated as the storage channel which was in error.

If however, the sequential testing fails to identify a single storage channel which is in error, the data stored in each of the channel memories 220A-220J, responsive to the particular read operation from the plurality of storage channels 210A-210J, is invalidated, so that a subsequent read request for that same data will require the data to be re-read from the plurality of storage channels 210A-210J. Subsequent to the invalidation of the data in the channel memories, the data is re-read from plurality of storage channels 210A-210J and the validation and auto-correction processing repeated, if sufficient time exists before expiration of a time period established for a read operation. Absent sufficient time to repeat the aforesaid method, an error message is output to the processor requesting the data from memory system 200.

The data which is read from the plurality of channel memories 220A-220J is processed by the dual parity generation engine 230 and transferred to the stage buffer memory 240. Part of the dual parity processing includes determining whether a bus parity error has occurred for any of the plurality of storage channels prior to initiating the sequential testing of the data stored in the plurality of channel memories 220A-220J. Further, the host CPU 260 communicates information as to any of the plurality of storage devices 210 which have previously been identified as being defective, or for which the data stored thereon is invalid, as when a new solid-state storage device has been installed and the data not yet rebuilt.

While the present invention has been particularly described with reference to FIGS. 1, 2, 3A and 3B, a particular number of solid-state storage devices 210 in the array 205, and a particular arrangement of processors to control operation of the memory system, it should be understood that the Drawing figures are for illustration only and should not be taken as limitations upon the invention. It is further contemplated that many changes and modifications may be made to the invention, by one of ordinary skill in the art, without departing from the spirit and scope of the invention as disclosed herein. In particular, equivalent elements and steps may be substituted for those specifically shown and describe, various method steps may be interchanged, and while the present invention has been described as advantageously implemented in various hardware and software components, it will be appreciated that some of those components implemented in hardware, may be implemented equally well in software, and conversely, some elements implemented in software may be implemented in hardware as well, all without departing from the spirit or scope of the invention as defined in the appended claims.

What is being claimed is:

1. A method for auto-correction of errors in an array of a plurality of solid-state storage devices, said array being arranged in a plurality of storage channels, the method comprising the steps of:
   (a) dedicating at least a portion of a plurality of solid-state storage devices to storing parity data to provide a fault tolerance for a loss of at least two of said plurality of solid-state storage devices;
   (b) performing a read operation from said array of a plurality of solid-state storage devices, said read operation including respectively transferring data read from each said plurality of storage channels to a corresponding channel memory;
   (c) reading said data from said channel memories and performing a parity check of said data read from said channel memories;
   (d) responsive to a failure of said parity check in an unidentified storage channel, testing said data to identify one of said plurality of storage channels as being in error; and
   (e) responsive to identifying said one storage channel as being in error, using the remaining other of said plurality of storage channels to provide valid data to a processor requesting said data.

2. The method as recited in claim 1, wherein the step of testing said data to identify one of said plurality of storage channels as being is in error includes the step of sequentially excluding data read from a different one of said plurality of channel memories from said parity check and determining if data from remaining channel memories provide valid data to thereby designate a storage channel corresponding to said channel memory from which data was excluded.

3. The method as recited in claim 1, further comprising the step of invalidating said data read from each said plurality of storage channels in said corresponding channel memory responsive to failing to identify any one of said storage channels being in error.

4. The method as recited in claim 3, wherein the step of invalidating said data read from each said plurality of storage channels is followed by the step of repeating said steps (b)-(e) if sufficient time exists before expiration of a time period established for a read operation.

5. The method as recited in claim 2, wherein the step of sequentially excluding data read from a different one of said plurality of channel memories is preceded by the step of determining whether a bus parity error has occurred for any of said plurality storage channels.

6. The method as recited in claim 1, wherein the step of reading said data from said channel memories includes the step of using a dual parity generation engine to transfer said data from said channel memories to corresponding buffer memories and performing said parity check.

7. The method as recited in claim 2, wherein the step of sequentially excluding data read from a different one of said plurality of channel memories is preceded by the step of determining whether a storage channel has been identified with a defective solid-state storage device or invalid data.

8. A method for auto-correction of errors in an array of a plurality of solid-state storage devices having a fault tolerance for a loss of at least two of said plurality of solid-state storage devices, said array being arranged in a plurality of storage channels, the method comprising the steps of:
   (a) performing a read operation from said array of a plurality of solid-state storage devices, said read operation including respectively transferring data read from each said plurality of storage channels to a corresponding channel memory;
   (b) reading said data in said channel memories and determining whether said data is valid, and if said data is valid transferring said valid data to a processor requesting said data; and
   (c) if said data is invalid, determining which of said storage channels is in error, said step of determining which of said storage channels is in error includes:
      sequentially excluding data from a different one of said plurality of channel memories and determining if data from remaining channel memories provide valid data; and,
      if valid data is obtained, designating a storage channel corresponding to said channel memory from which data was excluded as said storage channel in error, and transferring said valid data to the processor requesting said data.

9. The method as recited in claim 8, further comprising the step of invalidating said data read from each said plurality of storage channels in said corresponding channel memory if valid data fails to be obtained after the step of sequentially excluding data from a different one of said plurality of channel memories.

10. The method as recited in claim 9, wherein the step of invalidating said data read from each said plurality of storage channels is followed by the step of repeating said steps (a)-(c) if sufficient time exists before expiration of a time period established for a read operation.

11. The method as recited in claim 8, wherein the step of determining which of said storage channels is in error includes the step of determining whether a bus parity error has occurred for ay of said plurality storage channels.

12. The method as recited in claim 8, wherein the step of performing a read operation is preceded b the step of providing said array with at least two solid-state storage devices dedicated to storing parity data.

13. The method as recited in claim 8, wherein the step of reading said data in said channel memories and determining whether said data is valid includes the step of using a dual parity generation engine to transfer said data from said channel memories to corresponding buffer memories and establishing an integrity thereof.

14. The method as recited in claim 8, wherein the step of sequentially excluding data read from a different one of said plurality of channel memories is preceded by the step of determining whether a storage channel has been identified with a defective solid-state storage device or invalid data.

15. A method for auto-correction of errors in a data storage array, comprising the steps of:
    (a) providing a storage array formed by a plurality of data storage channels, said plurality of storage channels being formed with at least two parity storage solid-state storage devices and a multiplicity of data solid-state storage devices;
    (b) providing a channel memory corresponding to each of said plurality of storage channels for temporary storage of data to be written thereto and data read therefrom;
    (c) performing a read operation from said storage array, said read operation including respectively transferring data read from each said storage channel to said corresponding channel memory;
    (d) transferring said data from said plurality of channel memories to a buffer memory and determining if said data is valid, and if valid transferring said data from said buffer memory to a processor requesting said data;
    (e) if said data is invalid, then:
        i) repeating said step (d); and
        ii) if said data is invalid after repeating said step (d) and the storage channel in error is unidentified, determining which of said storage channels is in error by repeatedly transferring said data from said channel memories while sequentially excluding data from a different one of said plurality of channel memories and determining if data from remaining channel memories provide valid data.

16. The method as recited in claim 15, further comprising the step of invalidating said data read from each said plurality of storage channels in said corresponding channel memory responsive to failing to identify any one of said storage channels being in error.

17. The method as recited in claim 16, wherein the step of invalidating said data read from each said plurality of storage channels is followed by the step of repeating said steps (a)-(e) if sufficient time exists before expiration of a time period established for a read operation.

18. The method as recited in claim 15, wherein the step of transferring said data from said plurality of channel memories to said buffer memory and determining if said data is valid is performed by a dual parity generation engine.

19. The method as recited in claim 15, wherein the step of determining if said data is said includes the step of determining whether a bus parity error has occurred for any of said plurality storage channels.

20. The method as recited in claim 15, wherein the step of repeating said step (d) if said data is invalid is preceded by the step of determining whether a storage channel has been identified with a defective solid-state storage device as invalid data.

* * * * *